United States Patent [19]

Aihara et al.

[11] Patent Number: 4,774,910
[45] Date of Patent: Oct. 4, 1988

[54] ENGINE COOLING SYSTEM

[75] Inventors: Yasuyuki Aihara; Shinichi Kubota; Syunzaburo Ozaki, all of Saitama, Japan

[73] Assignee: Honda Giken Kogyo Kabushiki Kaisha, Tokyo, Japan

[21] Appl. No.: 922,012

[22] Filed: Oct. 21, 1986

[30] Foreign Application Priority Data

Oct. 21, 1985 [JP] Japan ................................ 60-233476

[51] Int. Cl.$^4$ ................................ F01P 7/02
[52] U.S. Cl. .................................. 123/41.2; 123/41.49
[58] Field of Search ................. 123/41.11, 41.12, 41.49

[56] References Cited

U.S. PATENT DOCUMENTS 4,168,456  9/1979  Isobe ................. 123/41.12
4,378,760  4/1983  Barge ................ 123/41.12
4,409,933 10/1983  Inoue ................ 123/41.12

FOREIGN PATENT DOCUMENTS 211523 12/1983 Japan ................................ 123/41.12

Primary Examiner—Willis R. Wolfe, Jr.
Assistant Examiner—Eric R. Carlburg
Attorney, Agent, or Firm—Lyon & Lyon

[57] ABSTRACT

An engine cooling system for cooling an internal combustion engine on a motor vehicle such as an automobile, for example, includes an engine stop detector for detecting when the operation of the engine is stopped, an oil temperature detector for detecting the temperature of lubricating oil in the engine, a controller responsive to signals from the engine stop detector and the oil temperature detector for ascertaining whether the temperature of the lubricating oil at the time the engine is stopped is in excess of a reference temperature or not and for issuing a control signal when the temperature of the lubricating oil exceeds the reference temperature, and a fan driver for driving an engine cooling fan in response to the control signal from the controller.

13 Claims, 5 Drawing Sheets

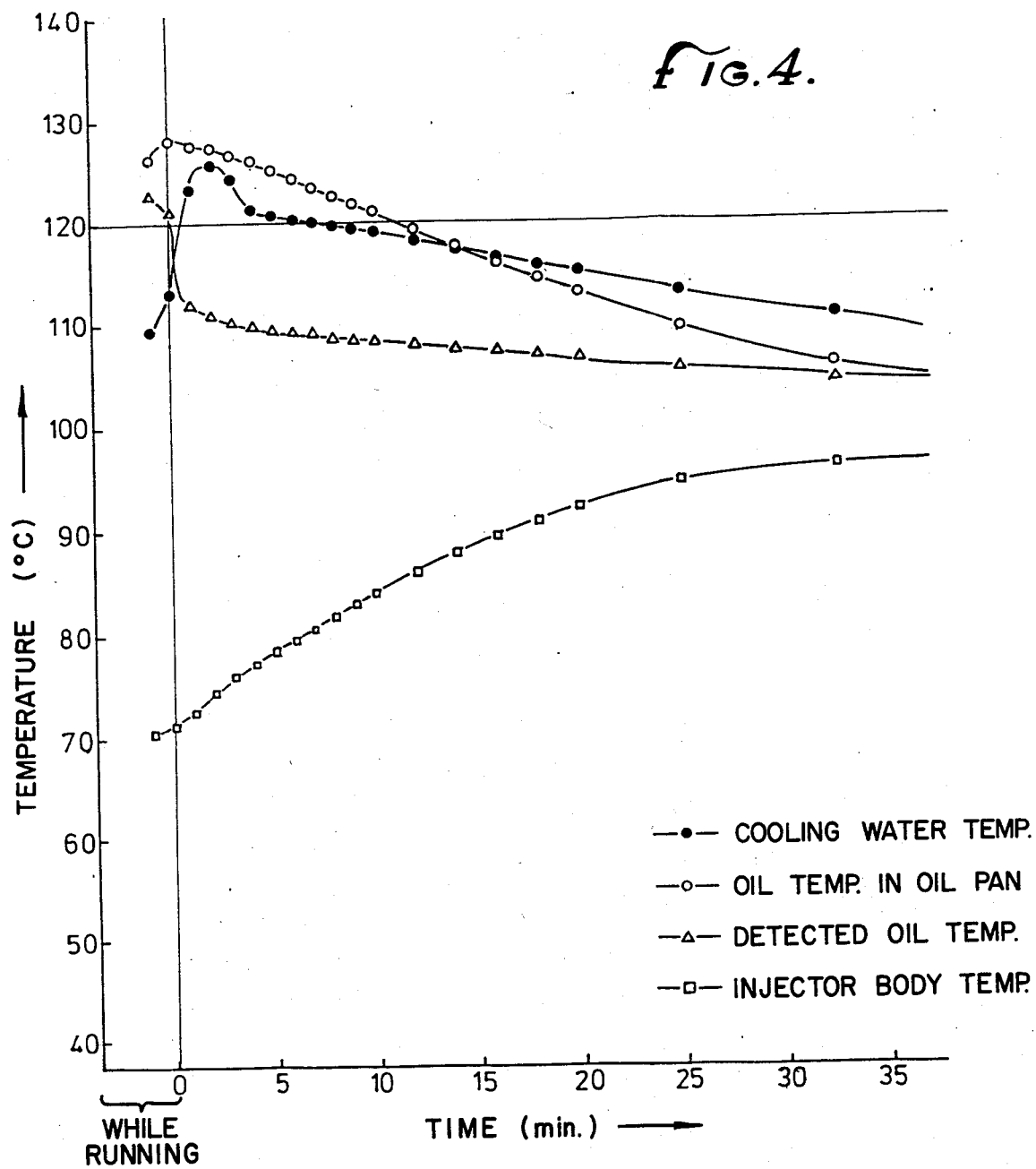

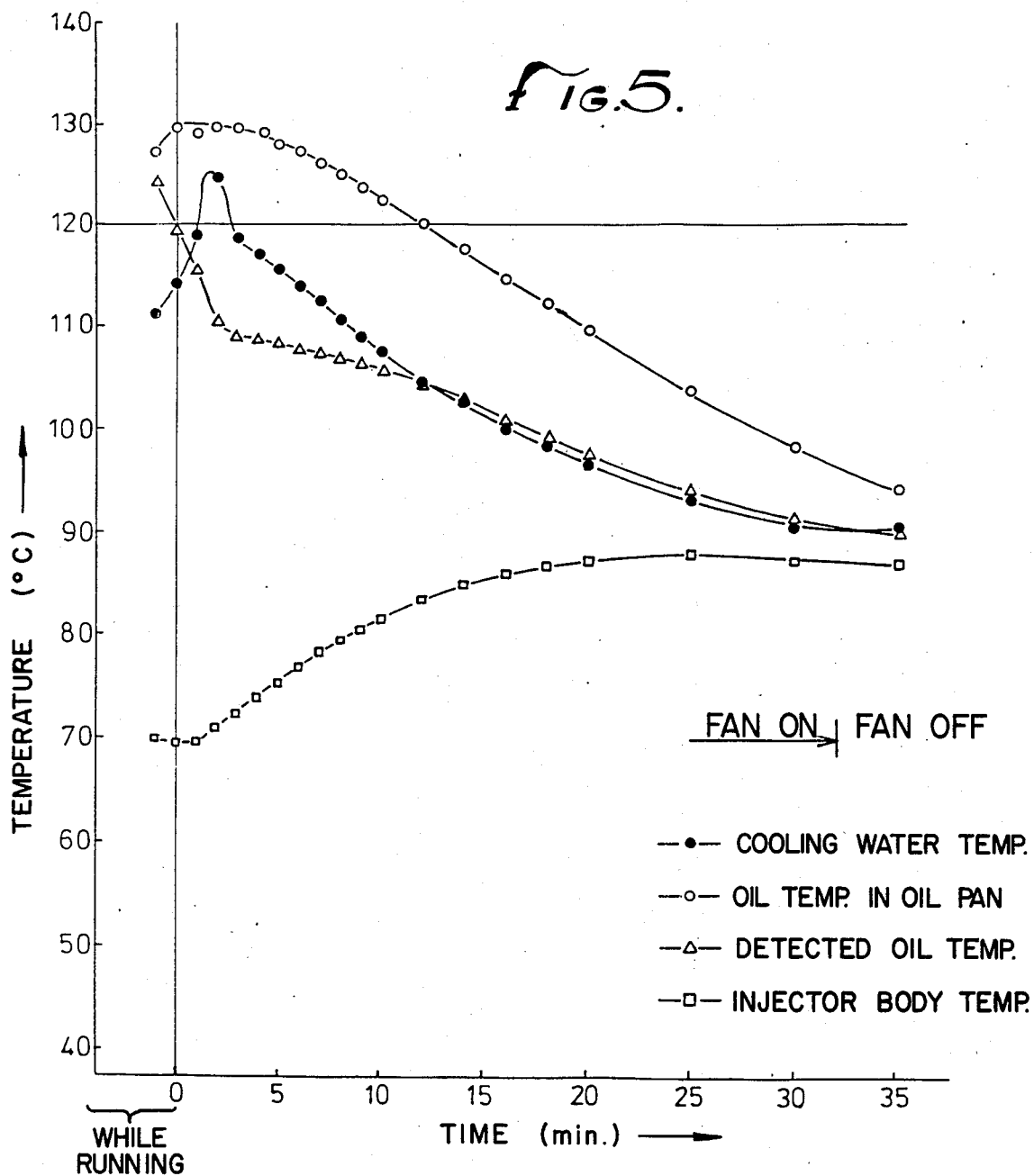

ENGINE COOLING SYSTEM

BACKGROUND OF THE INVENTION

The present invention relates to a system for cooling an engine when the operation of the engine is stopped under high-temperature conditions of the engine.

When a motor vehicle stops after it has run at a high speed, the heat radiated from the engine in the motor vehicle is trapped in an engine compartment when the operation of a radiator fan is stopped. The trapped heat tends to overheat fuel in fuel passages defined in a carburetor, thus casing socalled "percolation" to fill the fuel passages with evaporated fuel. When the engine is started again, the fuel vapor enters the combustion chambers where it wets the spark plugs thereby preventing an air-fuel mixture from being ignited.

Fuel pipes and a fuel pump are also heated under high underhood temperatures to produce vapor bubbles in the fuel. This phenomenon is called "vapor lock". The vapor bubbles prevent the fuel from being supplied to the engine, which therefore cannot be restarted. Where the engine is equipped with a fuel injection system, such vapor lock is also caused in fuel injection nozzles and fuel pipes coupled thereto which prevents the fuel from being injected from the nozzles with the proper timing into the combustion chambers.

One solution has been to drive a cooling fan while the engine is at a high temperature after it has been shut off. The cooling fan is started when a certain heated condition of the engine is detected. It has been customary to detect such a heated condition of the engine by detecting the temperature of cooling water in the radiator.

FIG. 6 of the accompanying drawings shows how the cooling water temperature varies with time. The graph of FIG. 6 indicates that the cooling water temperature rises to a large extent within 5 minutes right after the engine has been shut off. This temperature rise occurs because forced heat radiation from the cooling water in the radiator is no longer possible when the radiator fan is stopped. The temperature changes were plotted in FIG. 6 at an ambient temperature of 40° C. after the motor vehicle had run at 120 km/h. A temperature rise of more than 10° C. took place 2 minutes after the motor vehicle had stopped, and thereafter the temperature dropped.

If the cooling water temperature to start operating the radiator fan were selected to be 120° C., then it would start to operate about 1 minute after the stoppage of engine operation. This operation mode of the radiator fan would not be preferable since it might surprise the driver.

The boiling point of water is 100° C. at atmospheric pressure. The cooling water temperature in the engine cooling system is not substantially raised in proportion to the temperature of the engine itself, but is normally heated only up to about 130° C. during the engine operation. The cooling water temperature does not vary widely in a high temperature range, and does not well reflect the heated condition of the engine.

Where the cooling water temperature to trigger the radiator fan is selected to be relatively high for a certain motor vehicle type, therefore, the radiator fails to operate stably inasmuch as it may be driven or not driven even if the heated condition of the engine remains substantially the same.

In some radiator fan control schemes the fan is stopped in operation when the cooling water temperature drops below a certain reference temperature. If the reference temperature happens to be inappropriate, however, the cooling water temperature is apt to rise again after the fan has stopped, and the fan is required to be actuated again.

SUMMARY OF THE INVENTION

In view of the aforesaid drawbacks of the conventional engine cooling systems, it is an object of the present invention to provide an engine cooling system which detects the temperature of lubricating oil to detect the heated condition of an engine immediately after the engine has stopped, so that a radiator fan can be started instantly when required and can be operated for a desired interval of time.

According to the present invention, there is provided an engine cooling system for cooling an internal combustion engine in a motor vehicle including an engine stop detector for detecting when the operation of the engine is stopped, an oil temperature detector for detecting the temperature of lubricating oil in the engine, a controller responsive to signals from the engine stop detector and the oil temperature detector for ascertaining whether the temperature of the lubricating oil at the time the engine is stopped is in excess of a reference temperature or not and for issuing a control signal when the temperature of the lubricating oil exceeds the reference temperature, and a fan driver for driving an engine cooling fan in response to the control signal from the controller.

Since the engine cooling fan is controlled on the basis of the oil temperature at the time the engine is stopped, the engine can be cooled quickly when it is stopped, thus preventing percolation and vapor lock. The engine cooling fan is driven immediately after the engine has been stopped, so that the driver will not be surprised by the operation of the engine cooling fan. The engine cooling fan will be stopped automatically upon elapse of the preset period of time. Therefore, battery power consumption can be minimized.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a graph showing oil, cooling water, and injector body temperatures as they vary with time in the event that a radiator fan fails to operate after the engine has stopped;

FIG. 5 is a graph showing oil, cooling water, and injector body temperatures as they vary with time in the event that a radiator fan operates after the engine has stopped.

DESCRIPTION OF THE PREFERRED EMBODIMENT

Figure 1:
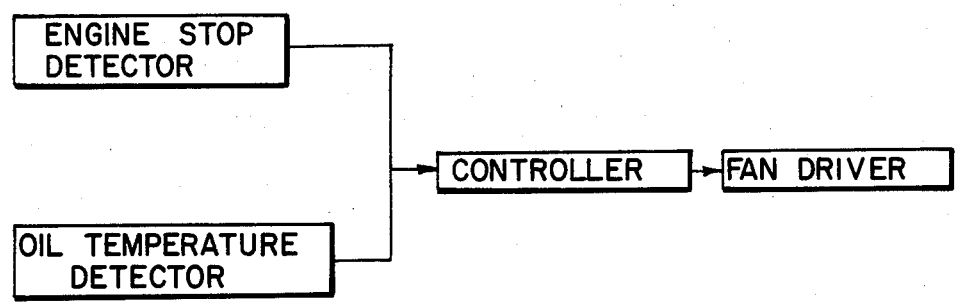
FIG. 1 is a block diagram of an engine cooling system according to the present invention.

FIG. 1 schematically shows a general arrangement of an engine cooling system according to the present invention. The engine cooling system for cooling an internal combustion engine in a motor vehicle such as an automobile, for example, includes an "engine stop detector" for detecting when the operation of the engine is stopped, and an "oil temperature detector" for detecting the temperature of lubricating oil in the engine. The engine cooling system also includes a "controller" responsive to signals from the engine stop detector and the oil temperature detector for ascertaining whether the temperature of the lubricating oil at the time the engine is stopped is in excess of a reference temperature or not and for issuing a control signal when the temperature of the lubricating oil exceeds the reference temperature, and a "fan driver" for driving an engine cooling fan in response to the control signal from the controller.

The engine cooling system of the present invention will be described in greater detail with reference to FIGS. 2 through 5.

Figure 2:
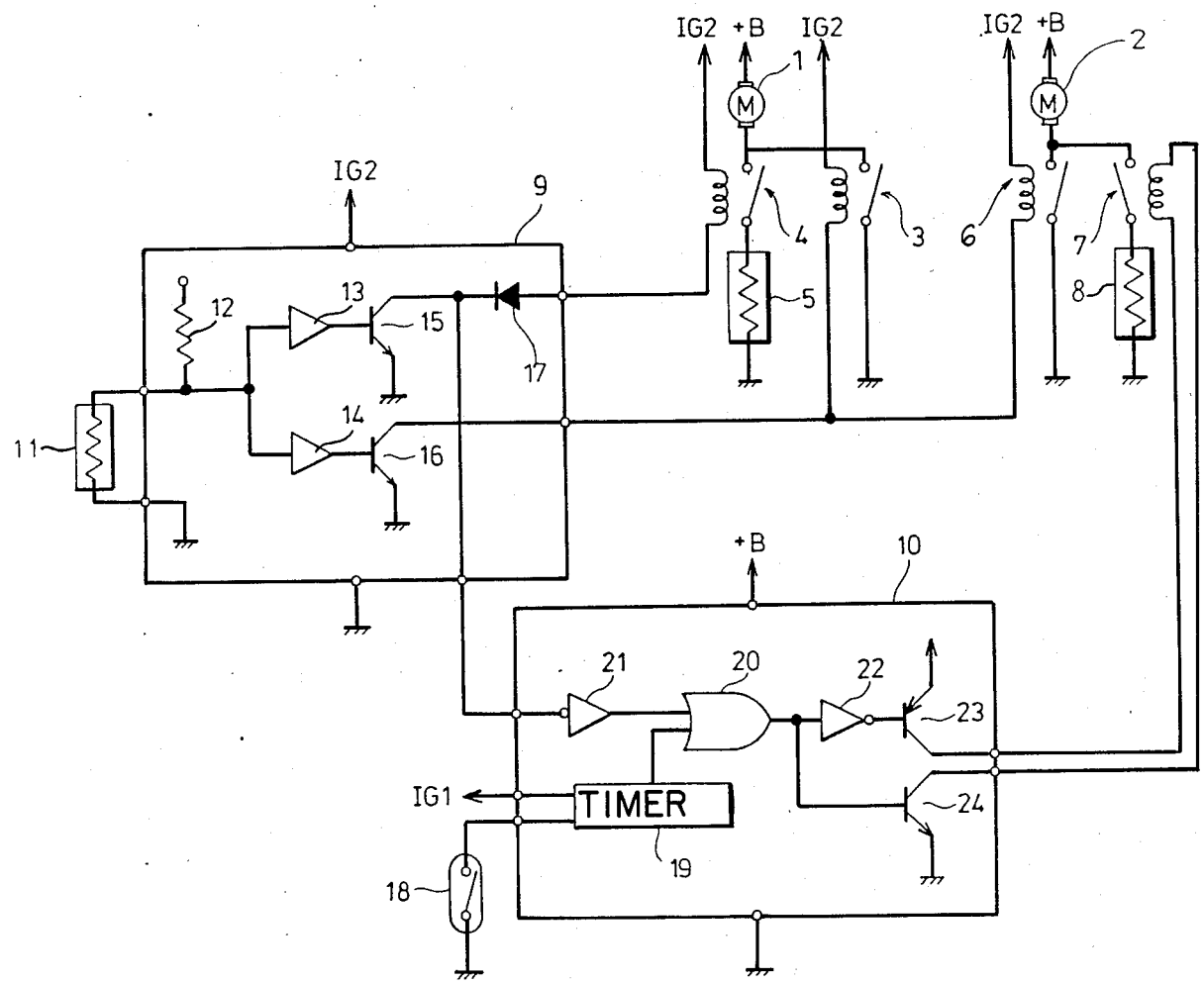
FIG. 2 is a circuit diagram of a detailed circuit arrangement of the engine cooling system.
Figure 6:
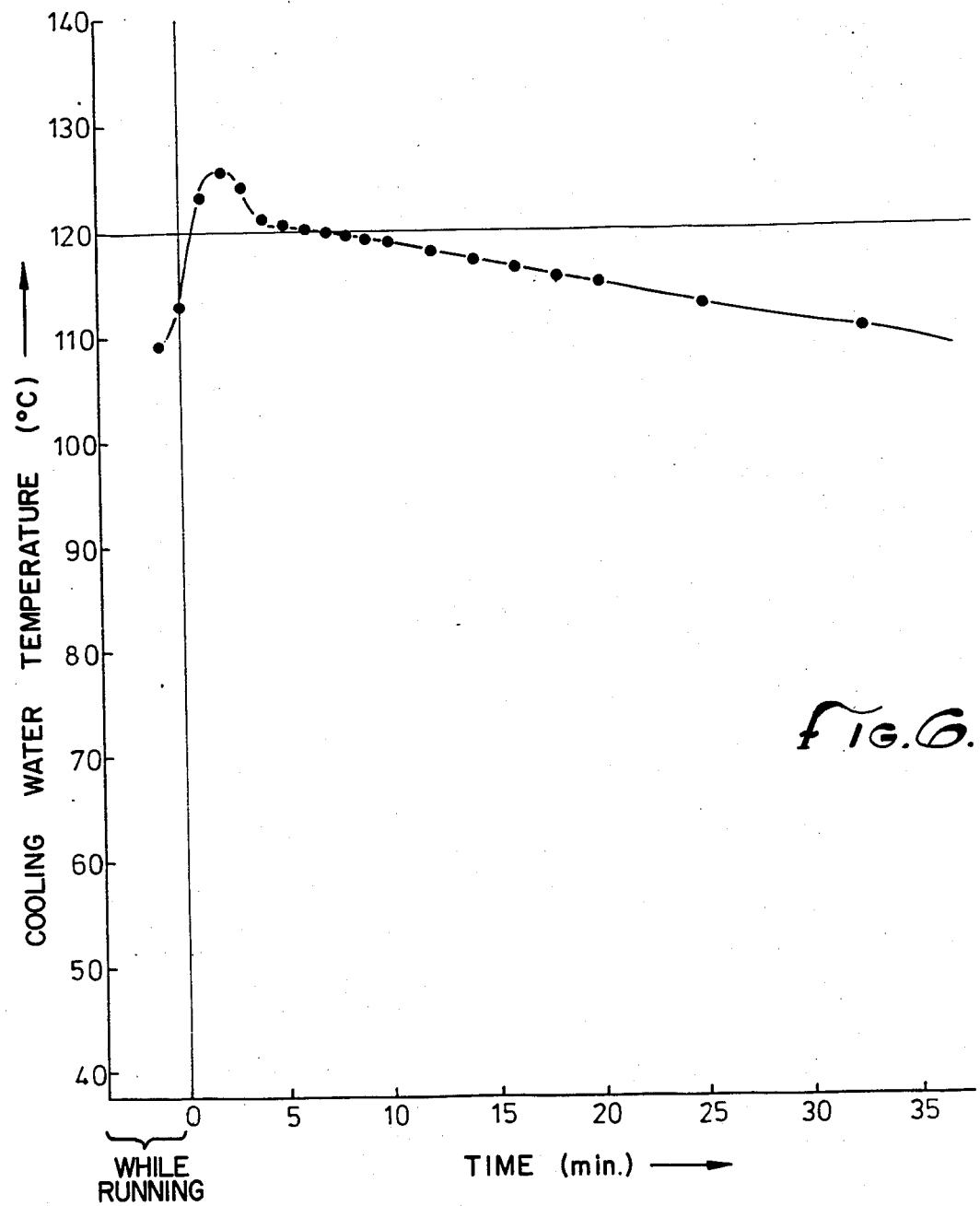
FIG. 6 is a graph showing how the temperature of cooling water in the engine varies with time after the engine has stopped.

FIG. 2 illustrates a detailed circuit arrangement of the engine cooling system for controlling a main fan motor 1 which drives a radiator fan to cool the engine and also for controlling a subfan motor 2 which drives a subfan to cool an air-conditioning condenser. The subfan motor 2 is smaller in size than the main fan motor 1 and can cool and radiator as well as the air-conditioning condenser. Each of the motors 1, 2 can be energized selectively in two modes, i.e., a higher-speed rotation mode and a lower-speed rotation mode. The main fan motor 1 is coupled to a circuit including a relay 3 for connecting the main fan motor 1 directly to a battery B to enable the main fan motor 1 to rotate at a higher speed, and another circuit including a relay 4 for connecting the main fan motor 1 to the battery B through a resistor 5 to enable the main fan motor 1 to rotate at a lower speed. Likewise, the subfan motor 2 is coupled to a circuit including a relay 6 for connecting the subfan motor 2 directly to the battery B to enable the subfan motor 2 to rotate at a higher speed, and another circuit including a relay 7 for connecting the subfan motor 2 to the battery B through a resistor 8 to enable the subfan motor 2 to rotate at a lower speed.

The relays 3, 4, 6 have relay coils connected to an ignition switch IG2 so that these relays will be energized when the engine is driven. The relay 7 has a relay coil connected to a timer circuit 10 (described below).

The relays 3, 4, 6, 7 for the motors 1, 2 are controlled by a radiator fan control unit 9 and the timer circuit 10. The radiator fan control unit 9 effects a control process for cooling the engine based on the temperature of cooling water in the radiator. The timer circuit 10, which is constructed in accordance with the present invention, effects a control process for cooling the engine based on the temperature of lubricating oil after the engine operation has been stopped.

The radiator fan control unit 9 will first be described below. A thermistor 11 for detecting the temperature of the cooling water in the radiator has one terminal grounded with the other terminal connected to a power supply through a resistor 12 and also to input terminals of comparators 13, 14. The comparator 13 has a reference voltage corresponding to the temperature of 84° C., whereas the comparator 14 has a reference voltage corresponding to the temperature of 90° C. The comparators 13, 14 have outputs connected to the bases of NPN transistors 15, 16, respectively. The transistor 15 has a collector connected to the relay coil of the relay 4 via a diode 17 and also to an input terminal of the timer circuit 10. The transistor 16 has a collector coupled to the relay coils of the relays 3, 6.

The timer circuit 10 includes a timer device 19 having input terminals to which there are connected an ignition switch IG1 and an oil temperature switch 18 which will be turned on when the temperature of the lubricating oil exceeds a certain reference temperature. The timer device 19 is set to a predetermined period of time, and starts measuring the time period if the oil temperature switch 18 is turned on when the ignition switch IG1 is turned off at the time of stopping the engine operation. The timer device 19 stops its operation when the predetermined timer period elapses. The ouput from the time device 19 remains high while it is measuring the time period.

The timer device 19 has an output terminal connected to one input terminal of an OR gate 20 with the other input terminal coupled via a NOT gate or inverter 21 to the collector of the transistor 15 in the radiator fan control unit 9. The OR gate 20 has its output terminal connected through an NOT gate or inverter 22 to the base of a PNP transistor 23 with its emitter connected to a power supply. The output terminal of the OR gate 20 is also joined to the base of an NPN transistor 24 with its emitter grounded. The transistors 23, 24 have respective collectors connected across the relay coil of the relay 7 for the subfan motor 2.

Operation of the control circuit arrangement shown in FIG. 2 now will be described. While the motor vehicle is running, the ignition switches IG1, IG2 are turned on. When the temperature of the cooling water in the radiator is 84° C. or below, the transistors 15, 16 are deenergized. Therefore, the relays 3, 4, 6, 7 are turned off, and the motors 1, 2 remain de-energized.

When the cooling water temperature exceeds 84° C., the transistor 15 is turned on and so is the relay 4 to cause the main fan motor 1 to rotate at the lower speed. At the same time, since the signal applied to the input terminal of the NOT gate 22 of the timer circuit 10 goes low, the transistors 23, 24 are energized through the OR gate 20 and the NOT gate 21. Therefore, the relay 7 is turned on to rotate the subfan motor 2 at the lower speed.

When the cooling water temperature is in excess of 90° C., the transistor 16 is energized to turn on the relays 3, 6. The motors 1, 2 are now rotated at higher speed.

As described above, while the motor vehicle is running, the motors 1, 2 are de-energized with the cooling water temperature being 84° C. or lower. When the cooling water temperature exceeds 84° C., the motors 1, 2 rotate at the lower speed. When the cooling water temperature is in excess of 90° C., the motors 1, 2 rotate at the higher speed. Consequently, the power to cool the engine is increased as the engine is more heated.

When the engine is stopped, the ignition switch IG2 is turned off to turn off the relays 3, 6, thus deenergizing the main fan motor 1. The subfan motor 2 is however controlled by the timer circuit 10.

If the oil temperature switch 18 is turned off, i.e., if the oil temperature is equal to or below the reference temperature when the ignition switch IG1 is turned off at the time the engine is stopped, the timer device 19 does not start measuring the time period. The output signal from the timer device 19 is low. Because both input signals applied to the OR gate 20 are low, the transistors 23, 24 remain de-energized, and hence the relay 7 is turned off. The subfan motor 2 remains de-energized.

If the oil temperature is in excess of the reference temperature when the engine is stopped, the oil temperature switch 18 is turned on. Therefore, the timer device 19 starts measuring the time at the same time that the engine is stopped. The output signal from the timer device 19 is high during the set time period, energizing the transistors 23, 24 to turn on the relay 7, thereby rotating the subfan motor 2 at the lower speed.

As described above, when the oil temperature exceeds the reference temperature after the engine has stopped, the subfan motor 2 is rotated at the lower speed for the predetermined time period to cool the engine. Since the temperature of the lubricating oil is being detected, the thermal condition of the engine can instantaneously be detected, so that the subfan motor 2 can be driven almost at the same time that the engine is stopped.

Figure 3:
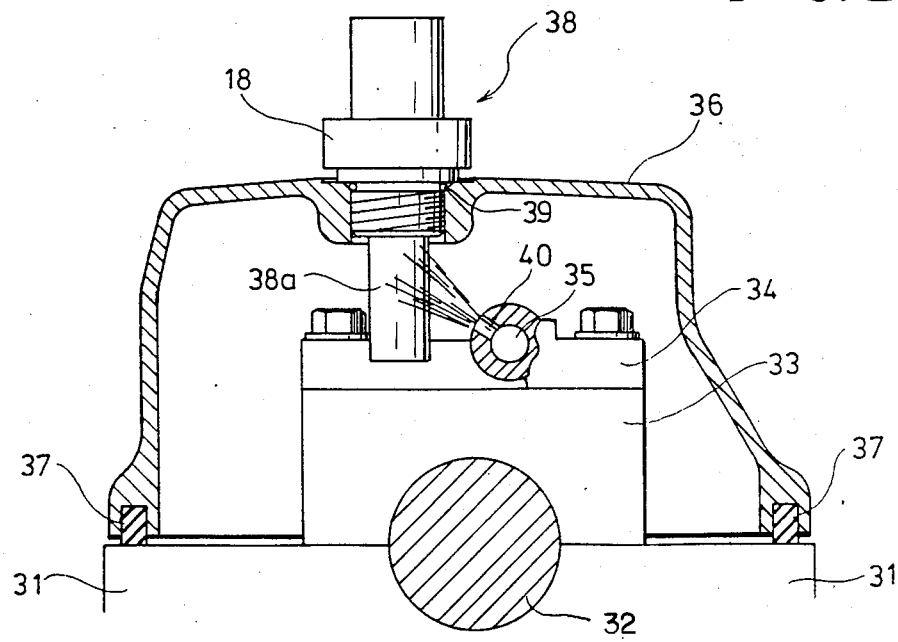
FIG. 3 is a cross-sectional view in elevation of an oil temperature sensor employed in the engine cooling system.

An oil temperature sensor 38 employed in the engine cooling system will be described with reference to FIG. 3 which shows in cross section an upper portion of the engine. An overhead camshaft mounted on an upper surface of a cylinder head 31 is rotatably supported at a camshaft journal 32 by a camshaft holder 33 fastened to the cylinder head 31. A camshaft holder pipe 34 with a main oil passage 35 defined therein is secured to an upper portion of the camshaft holder 33. The camshaft journal 32 and a cam (not shown) and a rocker arm slipper surface (not shown) held in sliding contact therewith are supplied with the lubricating oil via small passages and ejector holes from the main oil passage 35.

The camshaft, the camshaft holder 33, the camshaft holder pipe 34, and other members are covered by cylinder head cover 36 which is mounted in a fluid-tight manner on upper marginal edge of the cylinder head 31 by means of a head cover gasket 37.

The oil temperature sensor 38 is threaded in a hole defined in an upper portion of the cylinder head cover 36 with an O-ring 39 interposed therebetween. The oil temperature sensor 38 has an oil temperature probe 38a projecting into the cylinder head cover 36. The main oil passage 35 includes an oil ejector hole 40 radially opening toward the oil temperature probe 38a.

While the engine is being driven, the lubricating oil is supplied under pressure by an oil pump (not shown) from an oil sump through passages in the engine block and cylinder head and then through the main oil passage 35 to oil ejector hole 40 where the oil is ejected through the oil ejector hole 40 to the oil temperature probe 38a. Thus, the oil temperature sensor 38 can detect the temperature of the oil which is applied to the oil temperature probe 38a. Inasmuch as the applied oil has been fed under pressure through a side wall of the engine, the temperature of the oil is substantially indicative of the temperature to which the engine is heated, and the detected oil temperature is commensurate with the engine temperature.

The oil temperature switch 18 is attached to the oil temperature sensor 38 above the oil temperature probe 38a.

The oil temperature which is detected by the oil temperature sensor 38 after the engine has been stopped is plotted (as a succession of triangles) in FIGS. 4 and 5.

The embodiment of the present invention is incorporated in a fuel-injection engine, and the temperature of the fuel injector body of a fuel injection nozzle is also plotted (as a succession of squares) in FIGS. 4 and 5. The temperature of cooling water is also plotted (as a succession of black dots), and the temperature of oil in an oil pan below the engine is also plotted (as a succession of black line circles).

When these temperatures were measured, the temperature of ambient air was 40° C. and the motor vehicle ran at 120 Km/h. The data items shown in FIG. 4 were obtained when the subfan motor 2 was not driven, and the data items shown in FIG. 5 were obtained when the subfan motor 2 was driven for 32 minutes after the engine stopped.

Immediately after the motor vehicle stopped, the oil temperature detected by the oil temperature sensor 38 and the temperature of the oil in the oil pan exceeds 120° C., the cooling water temperature is below 120° C., and the temperature of the fuel injector body is about 71° C.

As times goes on, the detected oil temperature according to the present invention drops sharply, and the oil temperature in the oil pan drops gradually. The cooling water temperature first rises and then drops.

These temperatures drop more sharply when the submotor fan 2 is driven (FIG. 5) than when the submotor fan 2 is not driven (FIG. 4).

The injector body temperature started rising when the engine stopped because the introduction of ambient air was stopped and the main fan motor 1 was de-energized. When the subfan motor 2 was not driven (FIG. 4), the injector body temperature increased for a long period of time. In FIG. 4, it increased to 98° C., as a maximum, in 43 minutes after the engine has been stopped. At such a high temperature, the vapor lock tends to be caused.

When the subfan motor 2 was driven, the injector body temperature increased only to about 88° C., as a maximum, in about 25 minutes after the engine stopped, and then the temperature dropped. Therefore, any vapor lock can be prevented.

By selecting the reference temperature for the oil temperature switch 18 at about 120° C., the subfan motor 2 can be energized at the same time that the engine is stopped, thereby giving temperature characteristics shown in FIG. 5.

The same results can be obtained by controlling the subfan motor 2 based on the temperature of the oil in the oil pan. However, if the control were based on the cooling water temperature, the subfan motor 2 would start operating a few minutes after the stoppage of the engine, and this would not be preferable, as described above.

The subfan motor 2 controlled by the oil temperature is energized for a period of time which is determined by the timer device 19. Therefore, any wasteful consumption of the battery power is avoided.

Since the subfan motor 2 which drives the subfan after the engine has stopped is small in size and is rotated at a lower speed, it produces noise at a low level.

The subfan motor is driven for the preset period of time after the engine has stopped, and is also stopped when the oil temperature drops below the predetermined turn-off temperature of the oil temperature sensor 38.

While the present invention has been described as being incorporated in the fuel-injection engine, it is also applicable to an engine with a carburetor.

Although a certain preferred embodiment has been shown and described, it should be understood that many changes and modifications may be made therein without departing from the scope of the appended claims.

What is claimed:

1. An engine cooling system for cooling an internal combustion engine having a liquid coolant circulating system with a radiator and at least one engine cooling fan, comprising:
   engine stop detector means for detecting when the operation of the engine is stopped;
   oil temperature detector means for detecting the temperature of lubricating oil in the engine;
   controller means responsive to signals from said engine stop detector means and said oil temperature detector means for ascertaining whether the temperature of the lubricating oil at the time the engine is stopped is in excess of a reference temperature which may result in fuel percolation and vapor lock and for issuing a control signal when the temperature of the lubricating oil exceeds said reference temperature; and
   fan driver means for driving the engine cooling fan in response to the control signal from said controller means.

2. An engine cooling system according to claim 1, wherein said oil temperature detector means comprises an oil temperature sensor for detecting the temperature of lubricating oil to be supplied to an overhead camshaft.

3. An engine cooling system according to claim 2, wherein lubricating oil supply means are provided for the overhead camshaft and have an oil ejector hole for continuously ejecting oil on said temperature sensor while the engine is running.

4. An engine cooling system according to claim 1, wherein said controller means includes means for issuing the control signal for a preset period of time.

5. An engine cooling system according to claim 1, wherein said controller means includes a timer device for applying said control signal for a preset period of time.

6. In an internal combustion engine cooling system having a liquid coolant circulating system with a radiator and an electrically driven engine cooling fan, an improvement comprising, first means for detecting an engine stopping condition of the engine, second means for detecting the temperature of lubricating oil in the engine, and controller means for causing operation of the fan when the stopping condition is detected by said first means and said second means detects an oil temperature above a predetermined reference temperature which may result in fuel percolation and vapor lock.

7. The cooling system of claim 6, wherein said controller means includes timer means for causing said operation of the fan to terminate after a preset period of time.

8. The cooling system of claim 6, wherein said controller means includes means for causing said operation of the fan to terminate when the temperature of the oil as detected by said second means drops below a preselected temperature.

9. The cooling system of claim 8, wherein said controller means includes timer means for causing said operation of the fan to terminate after a preset period of time.

10. The cooling system of claim 1 wherein a main engine cooling fan and a smaller engine cooling subfan are provided, said fan driver means being for operating said subfan only in response to said control signal.

11. The cooling system of claim 10 wherein said subfan driver means has two speeds of operation, and means for causing operation of said subfan driver means at the lower of said two speeds in response to said control signal.

12. The cooling system of claim 6 wherein a second cooling fan is provided and larger than the first-said cooling fan for providing the main air circulation through the coolant radiator.

13. The cooling system of claim 12 wherein the first-said cooling fan is operable at two speeds and is operated at the lower of said two speeds in response to said controller means.

* * * * *